(12) United States Patent
Braganza et al.

(10) Patent No.: US 11,570,304 B2
(45) Date of Patent: Jan. 31, 2023

(54) ON-DEMAND CONTACT CENTER ELECTRONIC COMMUNICATION SYSTEM AND METHOD

(71) Applicant: Mitel Networks Corporation, Ottawa (CA)

(72) Inventors: Jonathan Braganza, Ottawa (CA); Nishu Sharma, Mountain View, CA (US); Kevin Lee, Kanata (CA); Darren Mombourquette, Nepean (CA); Timothy Kefford, Frisco, TX (US)

(73) Assignee: MITEL NETWORKS CORPORATION, Ottawa (CA)

( * ) Notice: Subject to any disclaimer, the term of this patent is extended or adjusted under 35 U.S.C. 154(b) by 0 days.

(21) Appl. No.: 17/230,578

(22) Filed: Apr. 14, 2021

(65) Prior Publication Data

US 2022/0337703 A1    Oct. 20, 2022

(51) Int. Cl.
*H04M 3/523* (2006.01)
*H04M 3/51* (2006.01)

(52) U.S. Cl.
CPC ....... *H04M 3/5233* (2013.01); *H04M 3/5175* (2013.01); *H04M 3/5183* (2013.01); *H04M 3/5238* (2013.01); *H04M 2203/2077* (2013.01)

(58) Field of Classification Search
CPC .... H04M 3/51; H04M 3/5175; H04M 3/5183; H04M 3/523; H04M 3/5233; H04M 3/5238; H04M 2203/2077
USPC ........................................ 379/265.11, 265.14
See application file for complete search history.

(56) References Cited

U.S. PATENT DOCUMENTS

| 6,064,730 A | 5/2000 | Ginsberg |
| 8,402,070 B2 | 3/2013 | Szlam et al. |
| 2012/0219144 A1* | 8/2012 | Acharya ........... H04M 3/42365 379/265.11 |
| 2013/0173687 A1 | 7/2013 | Tuchman et al. |
| 2014/0348321 A1* | 11/2014 | Javaregowda ...... H04M 3/5238 379/266.08 |
| 2015/0195407 A1 | 7/2015 | Kaufman |
| 2016/0065740 A1* | 3/2016 | Ristock ............. H04M 3/42068 379/265.11 |
| 2016/0127556 A1 | 5/2016 | Kirrane et al. |

\* cited by examiner

*Primary Examiner* — Harry S Hong

(57) ABSTRACT

Electronic communication methods and systems for rating agents and allowing customers for select agents are provided. Exemplary systems include a communication server for connecting a user to a communication with a contact center, a presence system to determine status of one or more agents, a wait-time determination engine to determine a wait time for one or more agents present for the communication, an agent scoring system for determining a score for one or more agents present for the communication, and a routing engine to connect a selected agent to the communication.

20 Claims, 3 Drawing Sheets

ON-DEMAND CONTACT CENTER ELECTRONIC COMMUNICATION SYSTEM AND METHOD

FIELD OF THE INVENTION

The present disclosure generally relates to electronic communication methods and systems. More particularly, examples of the disclosure relate to electronic communication methods and systems suitable for contact centers.

BACKGROUND OF THE DISCLOSURE

Call or contact centers can be used for a variety of applications, including taking orders, providing technical support, taking surveys, receiving complaints, providing services, and the like. Contact center agents can communicate with others, such as customers, using a variety of communication techniques, including voice calls, video calls, chats, texts, emails, or other electronic communication techniques.

Traditionally, contact centers are located in facilities with specialized spaces and offices, along with the call agents and technical equipment to support the agents. This model has begun to change in recent years with cloud computation, increasing data transmission speed over the Internet, and increased quality of service and improved technologies, such as browser-based calling. With these new technologies, agents are able to perform most or all contact center functions using a single application. Further, such technologies allow for contact centers to be virtual, where agents can work remotely. The use of virtual contact centers can lead to significant cost savings, because the virtual cost centers do not require a separate facility.

Traditional contact centers, whether facility-based or virtual, tend to operate under very rigid guidelines. Agents are typically required to clock-in for certain hours for their shifts and must be available for their entire shift, outside of short breaks or lunch. Agents are paid for their shifts, regardless of how many interactions they handle during that time. Similarly, the customer who is calling into the contact center to get service has no control over which agent they would be connected with for the service. With increasing need for flexibility in working hours and more people desiring to work from home or remotely, agents often want more time flexibility in their jobs to manage work and personal life better.

However, use of virtual contact centers can have challenges associated with a remote workforce. For example, it may be difficult to keep agents that work remotely engaged and motivated. Further, there may be a desire for on-demand services of contact center agents to, for example, provide more power to its users (e.g., agents and customers) in the choices they are making while providing and availing themselves to such services. Accordingly, improved electronic communication systems and methods are desired.

Any discussion, including discussion of problems and solutions, set forth in this section has been included in this disclosure solely for the purpose of providing a context for the present disclosure, and should not be taken as an admission that any or all of the discussion was known at the time the invention was made or otherwise constitutes prior art.

BRIEF DESCRIPTION OF THE DRAWING FIGURES

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements and wherein:

It will be appreciated that elements in the figures are illustrated for simplicity and clarity and have not necessarily been drawn to scale. For example, the dimensions of some of the elements in the figures may be exaggerated relative to other elements to help to improve understanding of illustrated embodiments of the present disclosure.

DETAILED DESCRIPTION OF EXEMPLARY EMBODIMENTS

The description of exemplary embodiments of the present disclosure provided below is merely exemplary and is intended for purposes of illustration only; the following description is not intended to limit the scope of the invention disclosed herein. Moreover, recitation of multiple embodiments having stated features is not intended to exclude other embodiments having additional features or other embodiments incorporating different combinations of the stated features.

As set forth in more detail below, exemplary embodiments of the disclosure relate to electronic communication systems and methods. The electronic communication systems and methods can be used in a variety of applications, including use in (e.g., virtual) contact or call centers. Exemplary methods and systems described herein allow agents and/or virtual agent companies to offer agent services based on a set of attributes that can be filtered, such as desired work hours, areas of expertise, and the like, while maintaining high-quality or even providing higher quality of service. In accordance with further examples, customers and/or organizations can have the flexibility or the option to choose an agent based on a score and/or fee, as described in more detail below.

Methods and systems described herein can allow virtual contact centers to be shared by multiple organizations or enterprises (such terms can be used interchangeably), such that agents that are registered with a virtual contact center can provide assistance to one or more organizations.

Exemplary methods and systems can further be used to provide motivation to agents to perform well, can facilitate recognizing (e.g., paying more to) agents that perform well, and can facilitate providing agents an ability to work remotely, with flexible shifts, while allowing customers, supervisors, and/or organizations to manually or automatically select agents suitable for various communications. Additionally or alternatively, exemplary methods and systems provide agents with flexibility to log on at desired times and accept or decline communications. Further, customers or enterprises can pay agents by an amount of time they spend on calls or a number of calls handled, rather than for a predetermined amount of time, regardless of a number of calls the agent handles or an amount of time spent on such calls.

Figure 1:
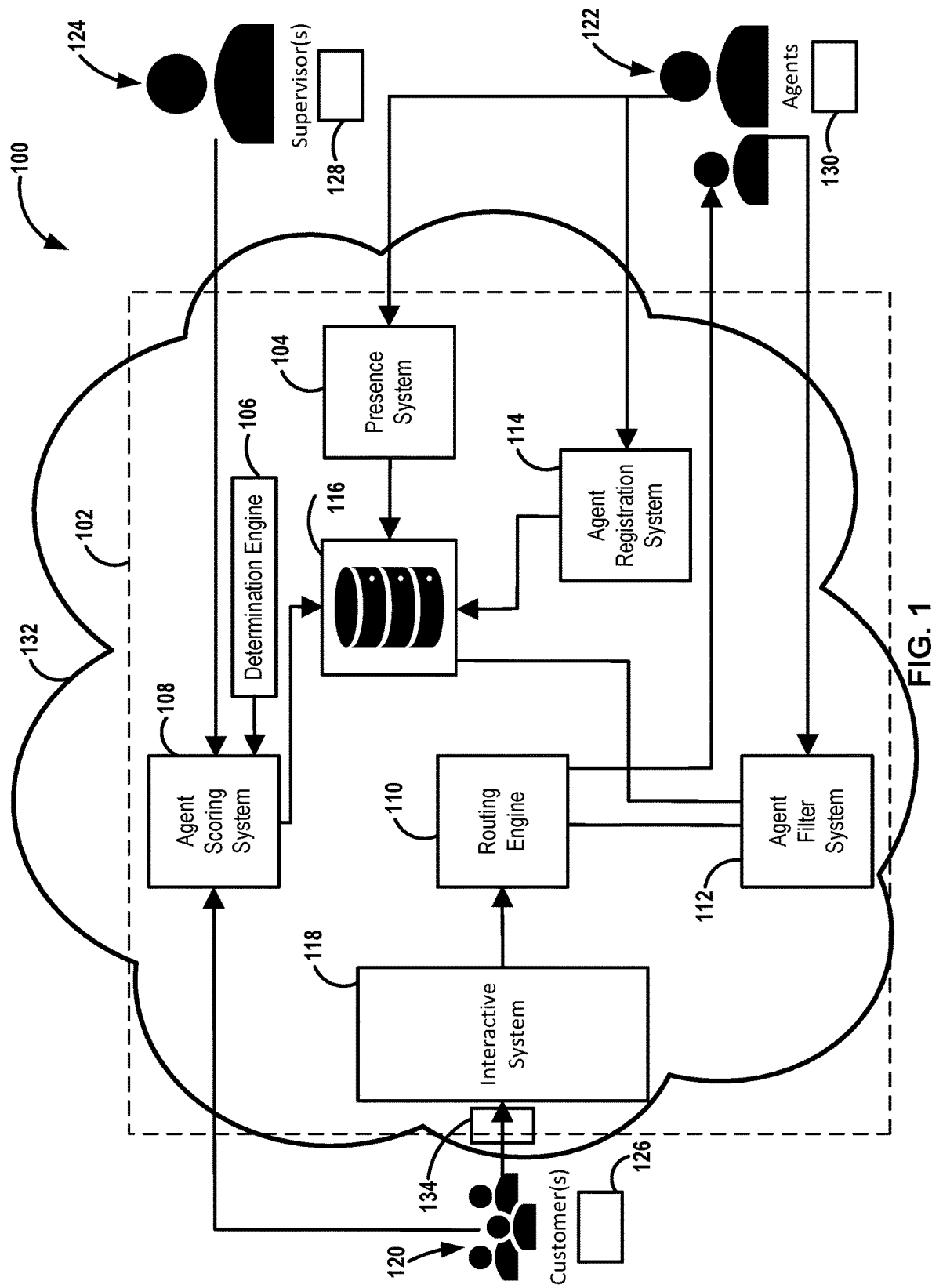
FIG. 1 illustrates an electronic communication system in accordance with exemplary embodiments of the disclosure.

Turning now to the figures, FIG. 1 illustrates an electronic communication system 100 in accordance with exemplary embodiments of the disclosure. For illustration purposes, system 100 is described in the context of a contact center. However, unless otherwise noted, systems and methods in accordance with embodiments of the disclosure are not so limited.

Electronic communication system 100 includes a communication server 102, a presence system 104, a wait-time determination engine 106, an agent scoring system 108, and a routing engine 110. Electronic communication system 100 can also include an agent filter system 112, an agent registration system 114, a database 116, and/or an interactive system 118. Electronic communication system 100 can include other devices, servers, networks, and the like, coupled to communication server 102 or to a network 132, such as devices 126, 128, 130. Although illustrated as part of communication server 102, presence system 104, wait-time determination engine 106, agent scoring system 108, a routing engine 110, agent filter system 112, agent registration system 114, database 116, and/or an interactive system 118 can be separate or independent from communication server 102. In such cases, the respective devices can form part of network 132.

Electronic communication system 100 can be used to connect customers 120 using a device 126 with one or more agents 122 using one or more devices 130. In addition, supervisor(s) 124 can input and/or access information using one or more devices 128, as described in more detail below.

Devices 126, 128, and 130 can be or include any suitable device with wired or wireless communication features and that can connect to communication server 102. For example, one or more of devices 126, 128, and 130 can be or include a wearable device, a tablet computer, a wired phone, a mobile phone, a personal (e.g., laptop or desktop) computer, a streaming device, such as a game console or other media streaming device, or the like. One or more of devices 126, 128, and 130 can include an application or client to perform various functions set forth herein and/or to cause to be displayed or otherwise presented information as described herein. By way of example, an application or client can display information corresponding to a communication with communication server 102; such displayed information can include, for example, agent identifiers, associated scores and/or wait times for the corresponding agent identifiers. In accordance with further examples of the disclosure, customer device 126 can be used to provide feedback for agents for the handled interactions to agent scoring system 108. Other functions of devices 126-130 are described in more detail below.

Communication server 102 can be or include any suitable server or set of servers, computing devices, and/or storage devices. Communication server 102 can perform various functions as described herein. For example, communication server 102 can provide electronic communication (e.g., audio, video, chat, text, and/or email) links between device 126 and one or more devices 128, 130. In accordance with an example of the disclosure, communication server 102 includes a private branch exchange (PBX) server.

In some cases, communication server 102 includes an interactive system 118, such as a switch+IVR module, and can also optionally include a user authentication module 134. Although separately illustrated, interactive system 118 and user authentication module 134 can be combined and/or various functions of one or more of interactive system 118 and user authentication module 134 can be separated into one or more additional modules and/or servers.

As used herein, "module" can refer to computer program instructions, encoded on computer storage medium for execution by, or to control the operation of, data processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of the substrates and devices. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., solid-state memory that forms part of a device, disks, or other storage devices). Systems and engines as described herein can be or include modules.

Interactive system 118 can be used to control call flows to and from communication server 102. When used, an IVR component of interactive system 118 can be used to allow callers to initially interact with communication server 102 via their telephone keypads and/or voice commands.

User authentication module 134 can be used to register a user or allow a user to login to an existing account. One or more of user authentication module 134 and interactive system 118 can be used to determine a task associated with the communication. For example, user authentication module 134 and/or interactive system 118 can request such information from customer 120 and/or automatically determine a task, based on, for example, natural processing language.

Presence system 104 can be used to determine a presence of one or more agents. For example, once logged on, presence system 104 can determine (e.g., by agent input or by accessing presence information on device 130) a presence of one or more (e.g., registered) agents. A presence can be, for example:

Available—This state can mean that the agent is ready to handle interactions. When, for example, skills of the agent match the task criteria for a given interaction (e.g., as determined using interactive system 118), the interaction may be offered to this agent.

Standby—This state can mean that the agent is not actively looking for tasks at this moment but can be contacted in case there is more demand and not enough available agents.

Unavailable—This state can mean that the agent is not available for a communication; an unavailable agent will not be connected to a communication or be presented to a customer as a possible agent.

Once presence information for one or more agents (e.g., all present agents or all registered agents) is detected or determined, presence system 104 can cause the presence information to be stored in database 116. The presence information can be updated by agent 122 using device 130.

Wait-time determination engine 106 determines an estimated wait time associated with each agent. If an agent is not on a communication and is available or on standby, the wait time may be zero. A wait time can be determined based on, for example, a number of agents available and/or on standby, a number of customers on hold, a number of customers on hold for a particular agent, and an average wait time for a particular agent or an average wait time for all agents. The wait times can further be based on average response times for one or more agents presently on communications.

Agent scoring system 108 can be used to (e.g., automatically) determine a score for one or more agents present for the communication. A score can be based on, for example, past user ratings (e.g., average or median) by customers and/or supervisors, average response times, agent fees, prior score from the particular customer on the communication, and the like. By way of particular examples, a present agent rating can be based on average prior user and/or supervisor ratings and a wait time associated for the agent. For example, customer ratings (e.g., 1-5) for an agent and an estimated wait time for the agent can be weighted to provide a score. One way to do this is to sort the wait times of present agents in order, and then assign the shortest wait time a highest score, and the longest wait time a score of 1.

In this case, the score for each agent=average customer rating for the agent+[X−(estimated wait time for the agent/longest estimated wait time)*Y], where X is the highest rating (e.g., 5) and Y is the number of present agents or a subset thereof (e.g., top 5 or the like with the highest customer rating). Alternatively, prior customer ratings alone can be used as a score and wait times for the agent can be separately presented to a customer. A customer can then use device 126 to select an agent to assist based on the score and/or wait time.

Routing engine 110 can be used to connect customer device 126 with a selected agent 122 device 130 during a communication. Routing engine 110 can be configured to route voice, video, and/or text (e.g., chat or text) communications to a selected agent.

Agent filter system 112 can be configured to (e.g., automatically) filter one or more agents from a connection to a communication based on one or more of fee, skill, region, enterprise affiliation, cloud technology, storage, or the like. Additionally or alternatively, agent filter system 112 can allow an agent to manually or automatically decline to be connected to a communication. An automatic decline can be based on, for example, a prior bad experience or low rating from customer 120, an undesirably low compensation for service, or the like. When an agent declines a communication, the information and any associated reason, along with the agent information, can be stored in a database, such as database 116, and can be used for subsequent filtering. Agent filter system 112 can be used to receive and cause to be stored (e.g., in database 116) information from agents regarding a communication. Such agent information can be used in determining an agent score. For example, if pay for a particular task is too low, an agent can provide such feedback and be filtered from similar tasks for similar, same, or less pay.

In accordance with further examples, agent filter system 112 can dynamically adjust the process of filtering agents based on feedback from agents. The configured requirements for the tasks can be reviewed again and adjusted for the feedback. For example, if more and more "low pay" rejections are received, agents can be presented with step increments in their pay (e.g., until the pay reaches the max pay configured for the task) as demands are increasing to reduce declination of calls. Agent filter system 112 can also adjust the filtering for required skills and ratings. Below are some of the cases of dynamic adjustment in the system.

- Increase a payment amount that is offered for successfully handling this interaction.
- Decrease a number of required skills for handling this interaction.
- Decrease a minimum required agent rating level for handling this interaction.

If these adjustments in the agent filter system do not result in an agent accepting the interaction, then the interaction can be canceled gracefully for the customer. The contact center enterprise can also receive a report stating that there were no agents available and the enterprise can choose to review the cause and see if there is anything they can do to remediate the situation. The contact center can decide to call back those customers for failed interactions, when agents make themselves available again.

Agent registration system 114 receives and causes to be stored (e.g., in a database, such as database 116) agent registration information. Exemplary agent registration information can include, for example, agent name, agent identifier, agent skills, agent pay (e.g., minimum pay requirement), preferred work schedule, and the like.

Databases 116 and/or other databases described herein can include one or more devices, such as computers or servers, to store information. By way of examples, database 116 can use one or more of Microsoft SQL Server, MySQL, Microsoft Access, Oracle, or the like relational database systems. Further, although illustrated as a single device, database 116 can include multiple devices and/or can be combined with other databases.

Network 132 can include or be, for example, an internet protocol (IP) network. Exemplary types of networks suitable for network 132 can be or include a local area network, a wide-area network, a metropolitan area network, one or more wireless networks, or a portion of the Internet. Various components of network 132 can be coupled to one or more other components using an Ethernet connection, other wired connections, and/or wireless interfaces. Network 132 can be coupled to other networks and/or to other devices typically coupled to networks. By way of particular example, network 132 includes a communication network and network 132 can be coupled to additional networks that can be coupled to one or more devices, such as device 120. Exemplary additional networks can include a network similar to network 132, a public switched telephone network (PSTN), or the like.

Figure 2:
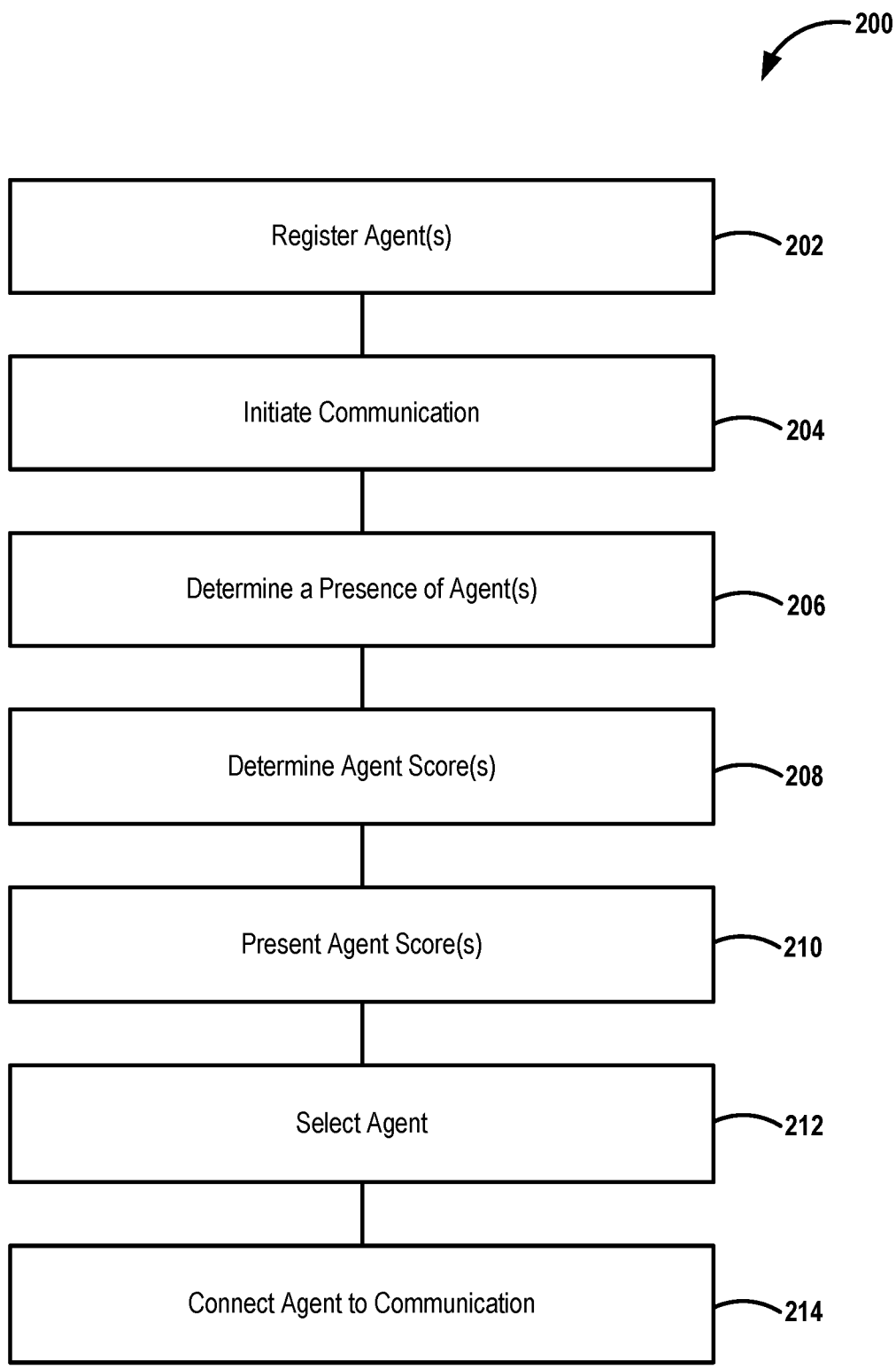
FIG. 2 illustrates a method in accordance with exemplary embodiments of the disclosure.

Turning now to FIG. 2, a communication method 200 in accordance with examples of the disclosure is illustrated. System 100 can be used to perform the steps of method 200.

Method 200 includes the steps of registering one or more agents (step 202), initiating a communication (step 204), determining a presence of the one or more agents (step 206), determining agent score(s) (step 208), presenting agent score(s) (step 210), selecting an agent (step 212), and connecting the selected agent to the communication (step 214). Unless noted otherwise, steps 202-214 need not be performed in any particular order. Further, various steps can be performed at the same time or can overlap in time.

A contact center can create or identify tasks for agents, which can be defined by topic and/or enterprise. The criteria can be used by an agent filter system 112 as described herein to filter present agents for a particular communication. In some cases, the criteria can include:

Best skill set required from agents—this is a stricter criteria for agent filtering for providing best service possible for business.

Relaxed or minimum skill criteria set for agents—this is a skill set which is used in the cases where best skilled agents are not available to meet demand.

Best ratings—this is another filtering criteria for agents. Ratings can be built by the system as the system matures and agents start handling more and more interactions.

Minimum ratings—typically this will be zero when enterprises want any agent regardless of their ratings to handle tasks or in the beginning where agents are new to the system.

Base minimum or maximum pay—how much a business wants to pay for an interaction.

Best pay—best case pay for the agents for the completion of tasks.

Once tasks and requirements are defined in the system, businesses are open for registration for agents over the Internet. Anyone with an internet connection can join the workforce as an agent. Agents can be registered and verified for their skills using the predefined criteria.

Registering one or more agents (step 202) can include agents 122 using a device, such as device 130, to register an agent with agent registration system 114. During the registration process, agent information, such as skills, preferred workdays and/or hours, agent name, enterprise affiliations, and the like can be received by agent registration system 114 and stored in a database, such as database 116.

During step 204, a communication is established. For example, a customer (e.g., customer 120) can initiate a communication with server 102 using customer device 126. The communication can include a phone call, a video call, a text message (e.g., SMS), a chat, email, or the like.

Once initiated, the communication can be received by, for example, interactive system 118. Interactive system 118 can present initial questions to a customer (e.g., via customer device 126) and can receive answers from a customer. The information collected by interactive system 118 can be conveyed to a routing engine (e.g., routing engine 110), which can select an agent and route the communication to a selected agent, as described in more detail below.

During step 206, the presence of at least one agent is determined. The presence can be determined by an agent logging on (e.g., to server 102 or network 132), by automatically detecting when an agent is near a device (e.g., device 130), by pushing a request and in response receiving presence information from the agent, or the like. As noted above, a presence of an agent can be available, standby, or unavailable. Once the status is determined (e.g., using presence system 104), the presence information can be stored in a database, such as database 116.

During step 208, a score for one or more agents is determined. As noted above, a score for each (e.g., registered) agent can be determined based on wait time and/or a rating. Ratings can be based on customer ratings, supervisor ratings, or a combination of the two, alone or in connection with other factors, such as wait time. A score can be updated based on, for example, a rating received from a customer and/or a supervisor and/or a (e.g., by 5, 10, 15 minutes or more) change in an estimated wait time for the agent to become available. Once determined, the score for each agent can be stored in a database, such as database 116.

During step 210, agent information (e.g., scores as determined by agent scoring system 108 and as stored in database 116) and/or wait times is presented to a customer (e.g., on device 126). In accordance with examples of the disclosure, agent information for only a subset (e.g., a preselected number of—e.g., two or more) of available (presence of available or standby) agents are presented to the customer. For example, agents with the highest (e.g., top 10 or top 5 or top 2) scores and optionally associated wait times for the (present) agents can be displayed. Alternatively, the agents with the shortest wait times (e.g., 2, 5 or 10 agents with the shortest wait times) and their associated scores and wait times can be presented on device 126.

In some cases, method 200 can additionally include a step of determining whether each present agent had a prior communication with the customer that initiated the communication during step 204. In this case, an agent with a previous communication with the customer can be highlighted. Additionally or alternatively, a score for the agent may be a score or an average of scores provided by the particular customer. Additionally or alternatively, a score may be determined based on a topic, which can be determined using, for example, interactive system 118.

Figure 3:
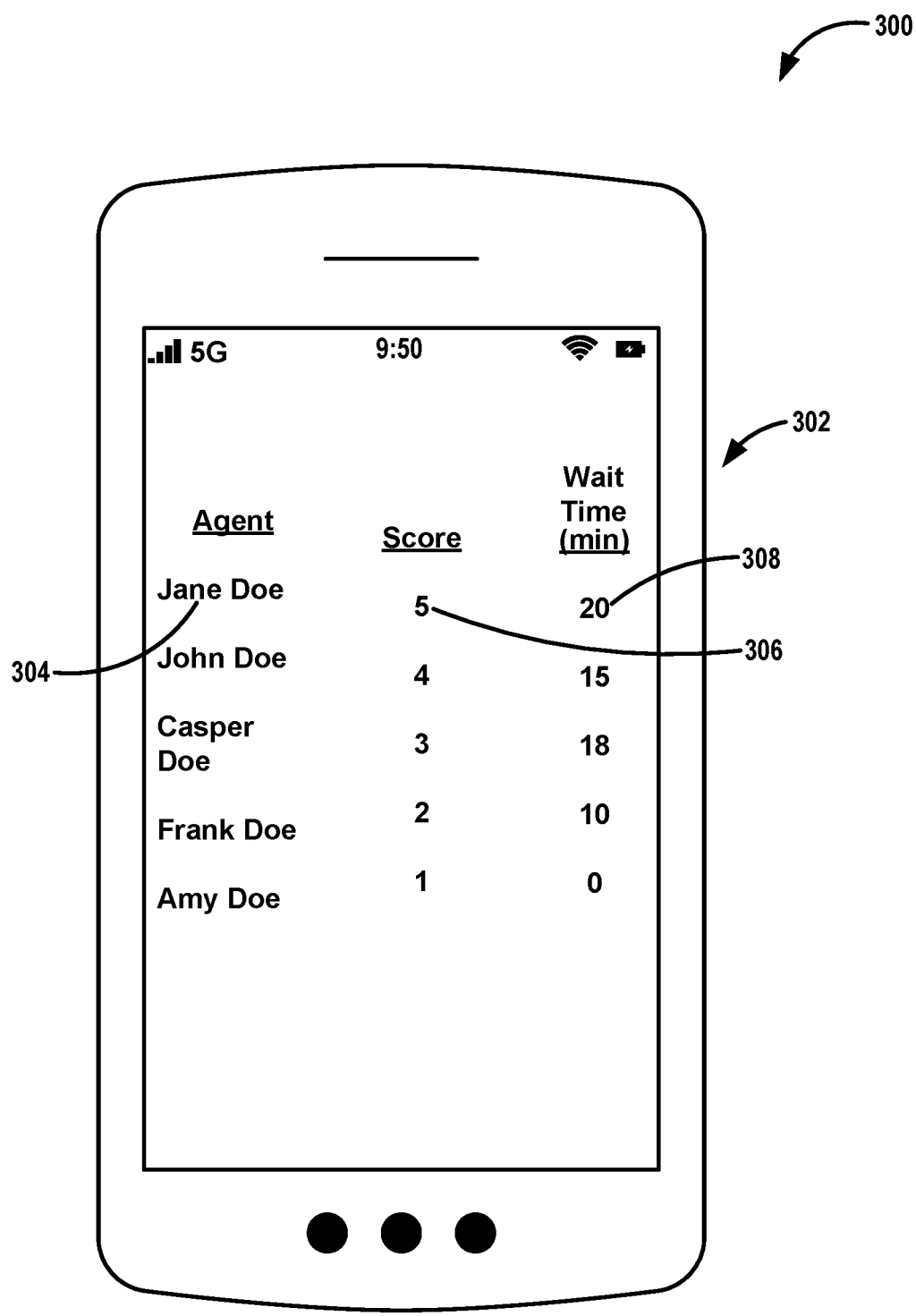
FIG. 3 illustrates a device and user interface in accordance with further exemplary embodiments of the disclosure.

An exemplary display of such information is illustrated in FIG. 3, which illustrates device 300, suitable for use as device 126. As illustrated, device 300 includes a graphical user interface 302, which can display a number of agent's identifiers 304, associated scores 306, and wait times 308. A fee associated with an agent's service can also be displayed and/or factored into a score determination.

In contact centers, it may be particularly desirable to allow customers to choose agents based on scores or ratings. For example, for skills such as healthcare and education, a customer may be willing to pay more for service from higher rated agents. If a customer is looking for support for mental health or any sort of counseling, he or she may want to talk to a person with a high rating even if the wait times are higher or the fees are greater. Further, using the exemplary system and method described herein, agents may be motivated to work well to get better ratings, so there are higher chances for them to get selected and/or paid more for a particular service. On the other hand, for the simpler tasks, customers wouldn't mind talking to an average rated agent if it's a task as simple as setting up a new printer, which requires agents to simply go through the predefined steps, and so a customer may select an agent with the lowest fee and/or shortest wait time. During step 212, a customer can select an agent based on, for example, a score and/or a wait time. Or, the customer can select a next available agent.

If the customer selects next available agent, the communication will be routed to all available agents (e.g., available or standby). The agents can be filtered using an agent filter system (e.g., agent filter system 112) for those agents with skills for the task—e.g., as determined by interactive system 118.

Once selected, an agent can be invited to join the communication with the customer. The agent can accept the invitation and then be connected to the communication (step 214). Prior to accepting to be connected to a communication, an agent can be provided, for example, a summary of the task, skills required to accomplish the task and an amount they will be paid if they handle the interaction and/or the amount they will be paid if they successfully complete the task. In some cases, a contact center business can choose how the agent is compensated for each interaction. Exemplary choices include:

A base payment amount for each interaction that is received.

A percentage that the agent will get when they handle the call vs. successful resolution.

Whether agents with more skill get paid more than those who have less skill.

Whether customer feedback affects the pay rate.

A customer is connected to an agent that accepts the communication first. If no available agents accept the communication, the communication will be routed to an agent on standby. An enterprise can pay an agent on standby that accepts the communication an additional sum.

Alternatively, the agent can decline the invitation. In this case, the agent can be presented with a menu and agents can be required to select a reason from the menu or input another reason. When the agent declines to join the communication, the agent can provide a reason, using the agent filter system, and the reason can be stored in a database, such as database

116. When the agent is connected to the communication, an amount of time an agent is connected to one or more communications can be monitored and optionally stored in database 116.

In accordance with alternative examples of the disclosure, rather than a customer selecting an agent, the customer can be automatically connected to an agent (e.g., an agent with the highest score and/or the lowest wait time). In some cases, the customer and agent can be automatically connected if the customer does not select an agent within a predetermined amount of time, or if the customer declined or defers making a selection.

As noted above, in some cases, rather than getting paid per shift, agents can be compensated only for the interactions they handle and as per their performance. This approach can be more cost effective for the contact center businesses. Depending upon what kind of operation is needed by the business, agents and/or organizations can choose between a complete freelancing agent model or a hybrid model (having both full-time employed and freelance agents)

The present invention has been described above with reference to a number of exemplary embodiments and examples. It should be appreciated that the particular embodiments shown and described herein are illustrative of the invention and its best mode and are not intended to limit in any way the scope of the invention as set forth in the claims. The features of the various embodiments may stand alone or be combined in any combination. Further, unless otherwise noted, various illustrated steps of a method can be performed sequentially or at the same time, and not necessarily be performed in the order illustrated. It will be recognized that changes and modifications may be made to the exemplary embodiments without departing from the scope of the present invention. For example, although much of the disclosure relates to a contact center business, the methods and systems can be used for other applications, such as a particular organization. These and other changes or modifications are intended to be included within the scope of the present invention, as expressed in the following claims.

The invention claimed is:

1. A communication system comprising:
 a communication server configured to connect a user to a communication with a contact center;
 a presence system configured to determine a status of each of one or more agents;
 a wait-time determination engine configured to determine a wait time for the each of the one or more agents who are present for the communication;
 an agent scoring system configured to determine a score for each of the one or more agents who are present for the communication; and
 a routing engine configured to connect a selected agent to the communication.

2. The communication system of claim 1, wherein the system presents score information for two or more agents present for the communication to a user.

3. The communication system of claim 2 that is configured to permit the user to select a present agent to connect to the communication.

4. The communication system of claim 3, wherein the agent scoring system automatically determines a score for each of the one or more agents present for the communication.

5. The communication system of claim 1, wherein the score for each of the one or more agents who are present for the communication is based at least in part on a user rating for the agent.

6. The communication system of claim 5, wherein the score for each of the one or more agents who are present for the communication is further based at least in part on the wait time for the agent.

7. The communication system of claim 1, wherein the score for each of the one or more agents who are present for the communication is based at least in part on a supervisor rating for the agent.

8. The communication system of claim 1, wherein the score for each of the one or more agents who are present for the communication is based at least in part on the wait time for the agent.

9. The communication system of claim 1, further comprising an agent filter system to filter the one or more agents based on one or more of fee, skill, region, enterprise affiliation, cloud technology, and storage.

10. The communication system of claim 1 that further includes an agent selection engine configured to select a set of agents.

11. The communication system of claim 1, wherein the system automatically connects the present agent with the highest score to the communication.

12. A communication method comprising the steps of:
 using an agent registration system, registering one or more agents;
 using a customer device, initiating a communication;
 using a presence system, determining a presence of each of the one or more agents;
 using a wait-time determination engine, determining a wait time for each of the one or more agents who are present for the communication;
 using an agent scoring system, determining an agent score for each of one or more present agents;
 providing the agent score for each of one or more present agents to the customer device;
 using the customer device, selecting an agent; and
 connecting the agent to the communication.

13. The communication method of claim 12, further comprising a step of determining whether each present agent had a prior communication with the user.

14. The communication method of claim 12, wherein the step of determining the agent score comprises using the wait time for each of the one or more of the present agents.

15. The communication method of claim 12, further comprising a step of presenting agent information to the user, wherein the agent information comprises an agent identifier, a wait time, and a score corresponding to the agent.

16. The communication method of claim 15, wherein the step of presenting agent information comprises presenting agent information for up to a preselected number of agents.

17. The communication method of claim 12, further comprising a step of automatically connecting the agent with the highest score to the communication.

18. The communication method of claim 12, further comprising a step of tracking an amount of time an agent is connected to one or more communications.

19. A communication system comprising:
 a communication server configured to connect a user to a communication with a contact center;
 a presence system configured to determine a status of one or more agents;

a wait-time determination engine configured to determine a wait time for one or more agents present for the communication;

an agent scoring system configured to determine a score for the one or more agents present for the communication;

a routing engine configured to connect a selected agent to the communication; and an agent filtering system configured to (a) automatically filter one or more agents from a connection to a communication based on one or more of fee, skill, region, enterprise affiliation, cloud technology, storage, and/or (b) allow an agent to manually or automatically decline to be connected to a communication.

20. The communication system of claim 19, wherein the system is configured to (a) present a predetermined number of present agents to a user and, (b) and permit the user to select an agent to connect to the communication.

* * * * *